Figure 1:
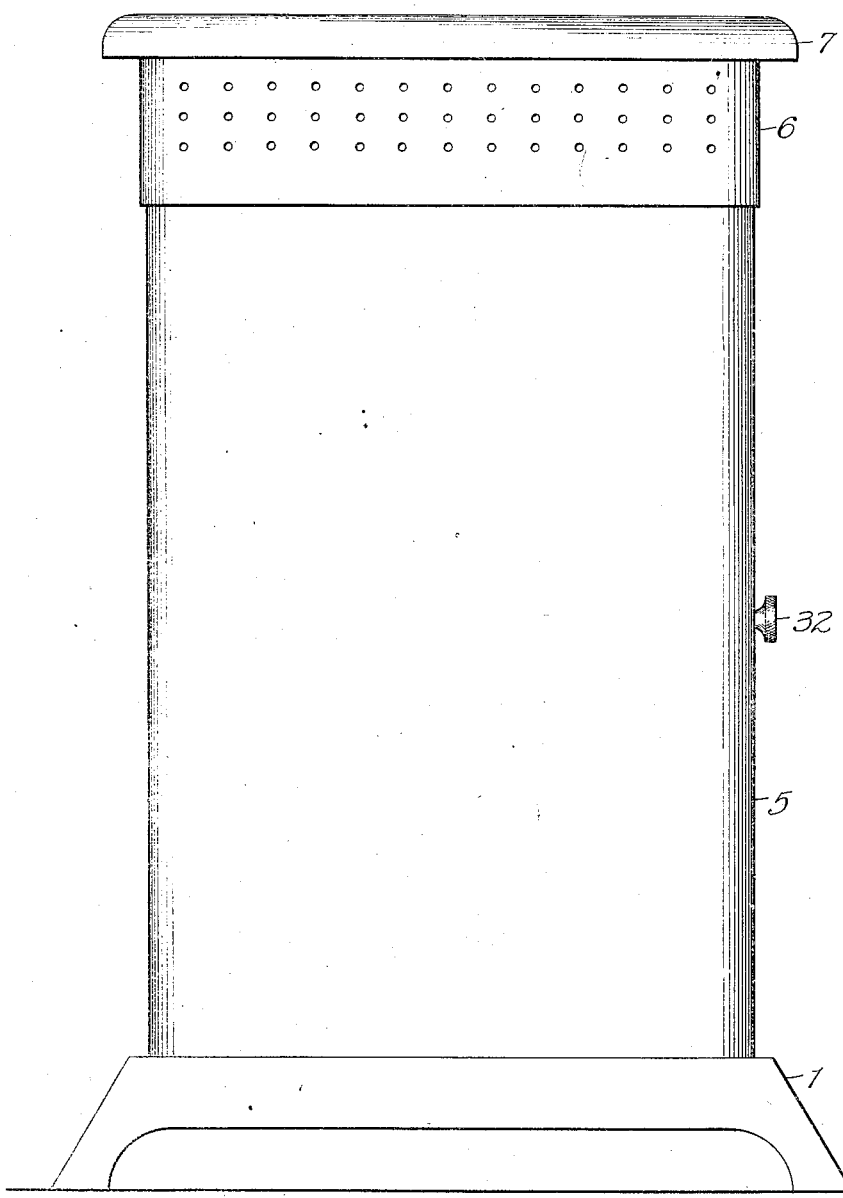

S. C. SHAFFNER & S. T. HUTTON.
MEANS FOR FILTERING AIR AND PRODUCING OZONE.
APPLICATION FILED JUNE 26, 1909.

977,336.

Patented Nov. 29, 1910.

4 SHEETS—SHEET 1.

Witnesses:

Inventors
Samuel C. Shaffner
Samuel T. Hutton
By
Attorneys

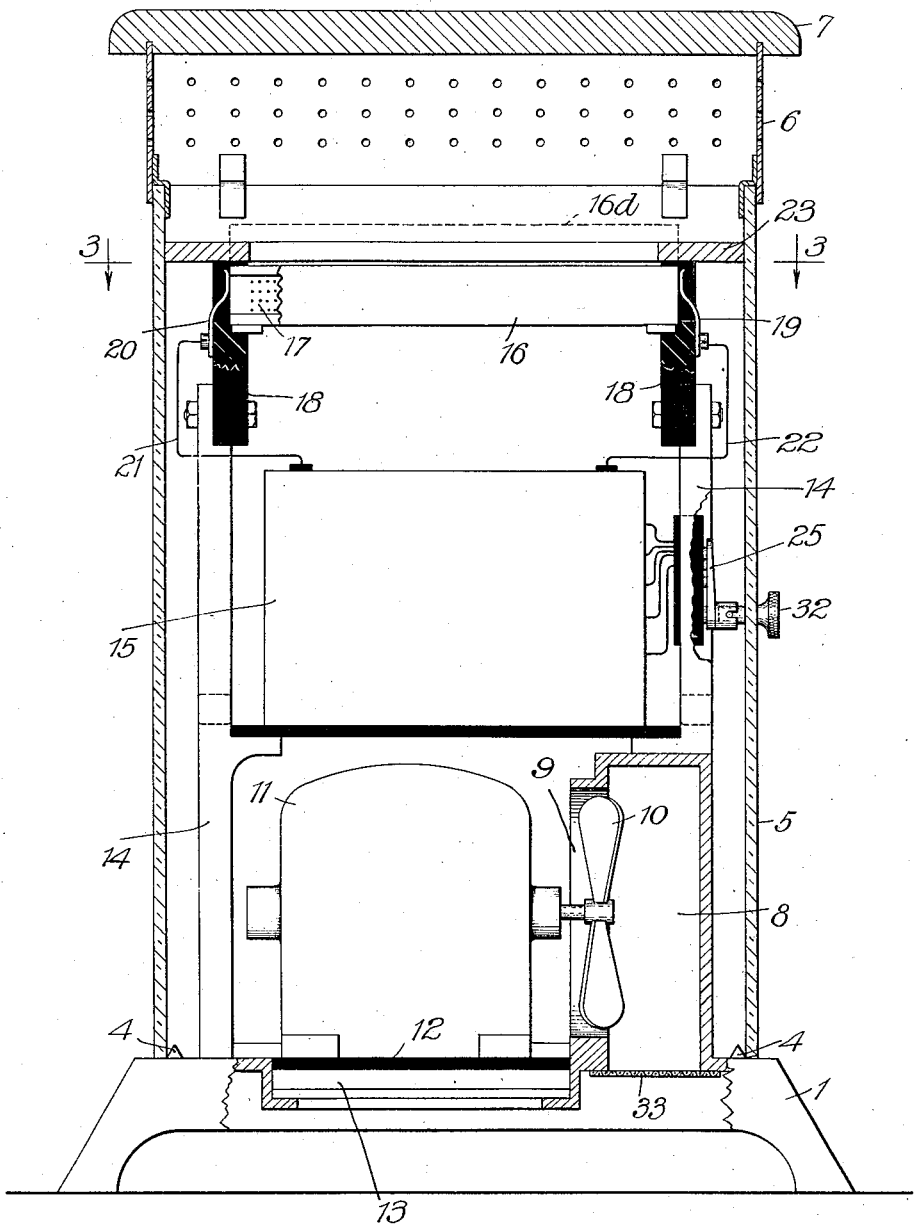

S. C. SHAFFNER & S. T. HUTTON.
MEANS FOR FILTERING AIR AND PRODUCING OZONE.
APPLICATION FILED JUNE 26, 1909.
977,336.
Patented Nov. 29, 1910.
4 SHEETS—SHEET 3.
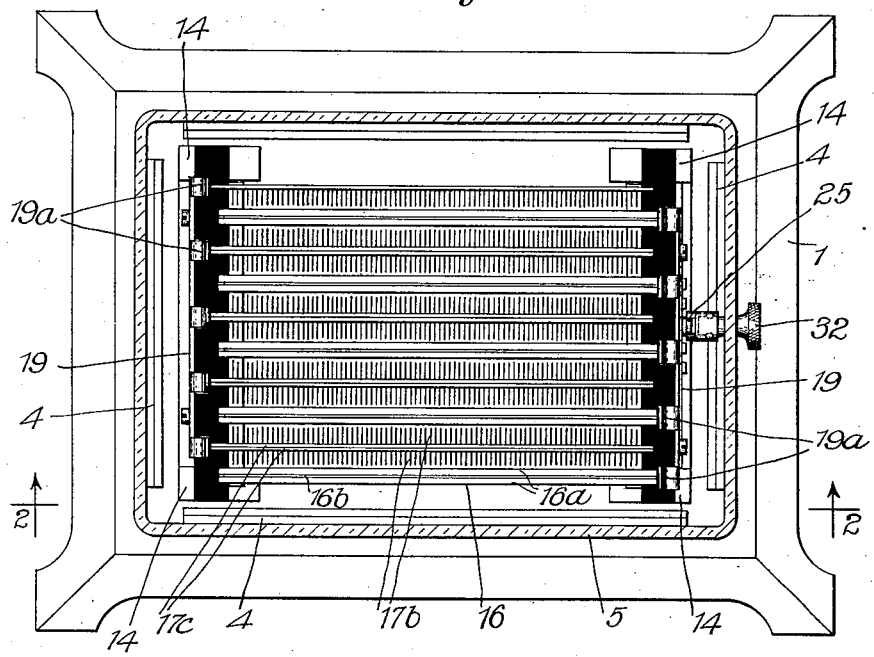
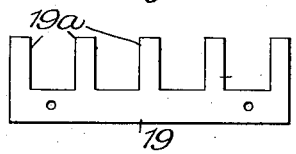
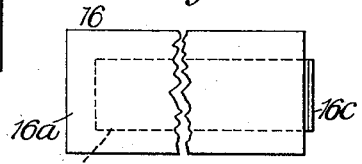
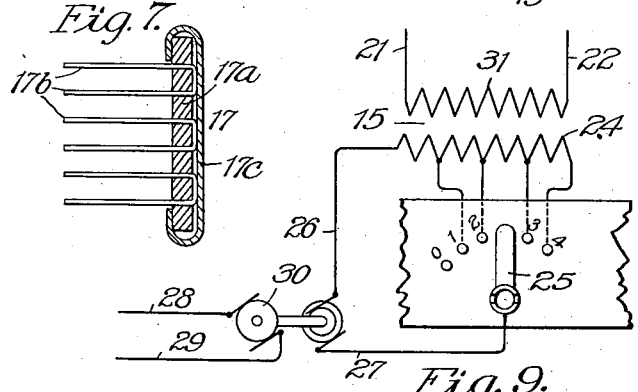
Witnesses:
Leonard W. Novander
Frank J. Thelen
Inventors
Samuel C. Shaffner
Samuel T. Hutton
By Brown & Williams
Attorneys S. C. SHAFFNER & S. T. HUTTON.
MEANS FOR FILTERING AIR AND PRODUCING OZONE.
APPLICATION FILED JUNE 26, 1909.
977,336.
Patented Nov. 29, 1910.
4 SHEETS—SHEET 4.
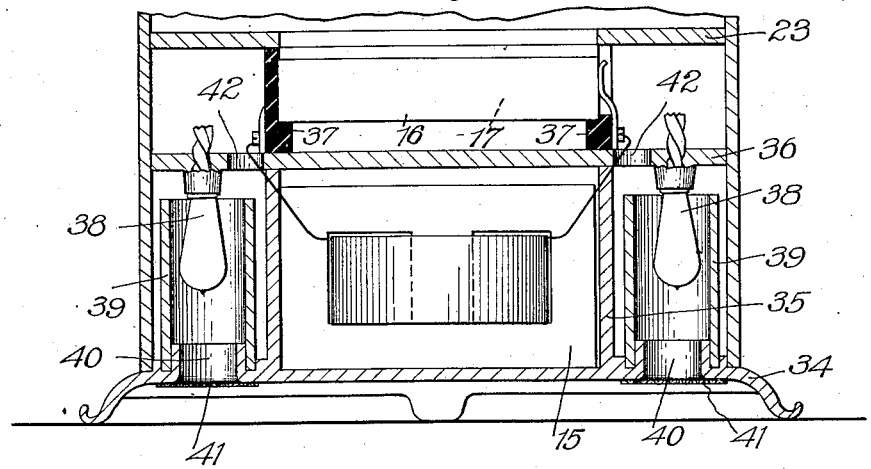
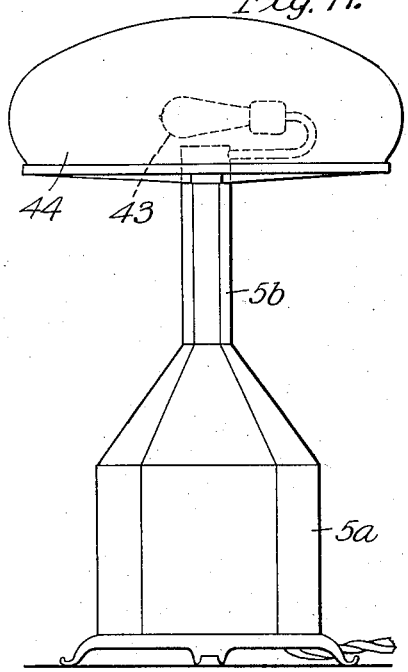
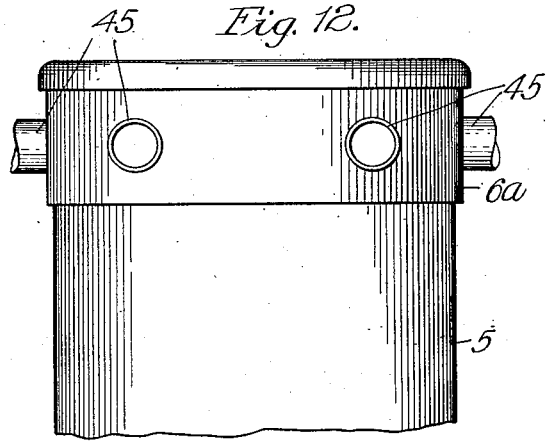
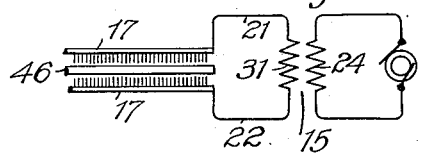
Witnesses:
Leonard W. Novander.
Frank J. Thelen
Inventors
Samuel C. Shaffner
Samuel T. Hutton
By Brown & Williams
Attorneys

UNITED STATES PATENT OFFICE.

SAMUEL C. SHAFFNER AND SAMUEL T. HUTTON, OF CHICAGO, ILLINOIS, ASSIGNORS TO NATIONAL AIR FILTER COMPANY, OF CHICAGO, ILLINOIS, A CORPORATION OF ILLINOIS.

MEANS FOR FILTERING AIR AND PRODUCING OZONE.

977,336. Specification of Letters Patent. Patented Nov. 29, 1910.

Application filed June 26, 1909. Serial No. 504,416.

*To all whom it may concern:*

Be it known that we, SAMUEL C. SHAFFNER and SAMUEL T. HUTTON, citizens of the United States, residing at Chicago, in the county of Cook and State of Illinois, have invented a certain new and useful Improvement in Means for Filtering Air and Producing Ozone, of which the following is a full, clear, concise, and exact description, reference being had to the accompanying drawings, forming a part of this specification.

Our invention relates to an improved means for purifying air by means of electrical discharges.

By our invention, the mechanism used to produce the condition of electrical stress required to effectively ozonize the air and remove from it particles of dust, dirt and impurities, is arranged so that the air to be treated passes through such mechanism with the least amount of resistance consistent with the thorough treatment of the same, and also that the apparatus is effective in producing a maximum result for a minimum amount of space occupied by such apparatus.

It is a further object of our invention to construct the electrodes used to produce the electrical discharges in such a manner that they may be readily placed in operative position in the machine and that they may be removed therefrom with facility to permit cleaning them. Our construction contemplates the arrangement of these electrodes in such a manner that a given size machine may be used with varying numbers of electrodes, which electrodes may be placed in the machine in any desired number necessary to produce the result required. In this way, machines of varying capacity may be made which are composed of standard parts, all of which are alike, and furthermore the only difference in electrode arrangement is the use of a greater number of electrodes for the larger size machines.

Our invention further contemplates the use of means to cause the flow of air through the machine, consisting in a fan adapted to coöperate with a part of the casing of the machine in such a way that the air must pass through the fan and is drawn into the bottom of the machine and forced upward and out through the top of the machine, the construction of which necessitates the passage of the air between the electrodes.

The several drawings illustrating our invention are as follows:

Figure 1 is a side view of the machine complete; Fig. 2 is a vertical sectional view taken along the line 2—2 in Fig. 3; Fig. 3 is a horizontal sectional view of the parts shown in Fig. 2 taken along the line 3—3; Fig. 4 is a detail view of a connector used to make contact with the electrodes; Fig. 5 is a top view of one of the condenser electrodes; Fig. 6 is a side view of the electrode shown in Fig. 5; Figs. 7 and 8 are detail sectional views showing the construction of the brush electrodes; Fig. 9 is a diagrammatic drawing showing the circuit connections of the transformer employed to the circuit controlling mechanism; Fig. 10 is a vertical sectional view of a modified form of apparatus; Fig. 11 is a side view of a combined purifying machine and electric lamp, in which the lamp serves the double purpose of illumination and assisting in the circulation of the air through the machine; Fig. 12 shows a modified arrangement of machine adapted for supplying purified air to localities at a distance from the machine; Fig. 13 is a diagrammatic view showing the circuit arrangement employed for conditions in which it is desirable to use only brush electrodes.

Similar numerals refer to similar parts throughout the several views.

As shown in Figs. 1, 2 and 3, a base 1 is employed, which has formed on its upper face projecting ridges 4—4 to engage the casing 5 and retain it in place. The casing 5 may be of any desired material, but we have found sheet metal to be particularly adapted for this use. The casing 5 is secured to the base in any desirable way, not shown. At the upper end of the casing 5 a perforated band 6 is mounted, the upper end of such band being closed by a top plate 7. The base 1 has formed at its right hand end, as shown in Fig. 2, a passage 8, open at the bottom and at the left hand side for supplying air through the bottom of the base into the inside of the machine. The opening 9 in the left hand side of the passageway 8 is circular and slightly larger in diameter than the fan 10 secured to the shaft of the motor 11 and disposed in the opening 9. The motor 11, which may be a motor generator in case the current supplied is direct, or an alternating current motor in case the current supplied is alternating, rests upon an insulating plate 12, which in turn rests upon a plate 13 of deadening material supported by the base 1. The base 1 also supports a framework 14 adapted to carry just above the motor 11 a transformer 15, and above the transformer 15 at the upper end of such framework are disposed the several electrodes 16 and 17. These electrodes are supported by insulating blocks 18 secured to the upper end of the framework 15, which blocks 18 carry terminal clips 19 and 20 conformed as indicated in Fig. 4, so that a plurality of spring tongues 19ª project upwardly from the body portion of the clip. The blocks 18 have formed in their upper edges a plurality of slots adapted to receive in vertical arrangement the electrodes 16 and 17. The electrodes 16 are condenser electrodes in the modification shown in Figs. 2 and 3, while the electrodes 17 alternating with the electrodes 16 are brush electrodes. Each of the electrodes 16 is constructed as indicated in Figs. 5 and 6 of two thicknesses of glass 16ª, between which a strip of thin metal or metal foil 16ᵇ is disposed. The strip 16ᵇ is narrower than the strips of glass 16ª and does not extend to the left hand end of such strips, as shown in Figs. 5 and 6, but projects beyond the right hand end of the strips 16ª and is folded, as shown at 16ᶜ, to form a terminal adapted to engage one of the spring tongues 19ª. The strip 16ᵇ is cemented to each of the strips 16ª, and thus the elements of the electrode are securely held together.

Each of the electrodes 17 consists in a body portion 17ª of fibrous material, through which a plurality of metallic wires 17ᵇ are passed. In the electrode shown in Figs. 7 and 8, the wires 17ᵇ are U-shaped and pass through the body portion 17ª so that the two ends are exposed while the central portion of each strip 17ᵇ is in engagement with a metallic backing plate 17ᶜ formed around the edges of the body portion 17ª, as indicated. In order to insure good contact between the U-shaped conductors 17ᵇ and the metallic back plate 17ᶜ, use may be made of a layer of finely divided metal 17ᵈ applied in the form of a paste to the back of the body portion 17ª. The backing plate 17ᶜ may then be applied, or before applying such plate a thin strip 17ᵉ of metal foil may be placed over the paste, after which the backing plate 17ᶜ is secured around the body portion 17ª, as before. This results in a very effective connection between the wire terminals 17ᵈ and the backing plate 17ᶜ. The ends of all of the backing plates 17ᶜ are in engagement with the spring tongues formed on the terminal 20 and are thus effectively connected by means of wire 21 to one terminal of the secondary winding of the transformer. The other terminal of the secondary winding of the transformer is connected by wire 22 with the terminal 19. It is to be noted that the electrodes 17 are arranged in pairs, back to back, as a result of which each spring tongue of the terminal 20 is connected to two of such electrodes except the one at the back of the machine, which, since it is an outside electrode, consists only of one electrode 17 having the wires 17ᵇ projecting inward toward the adjacent electrode 16.

After the electrodes 16 and 17 have been put in place, a horizontal diaphragm 23 of insulating material, as wood, is placed upon the blocks 18, which diaphragm has an opening therein of practically the same size as the area covered by the top edges of the electrodes. The opening in the diaphragm 23 is proportioned according to the number of electrodes used, and if it is desired to use fewer electrodes than those shown in Fig. 3, they may be omitted without interfering with the operation of the remaining electrodes, and their place may be filled either by means of dummy blocks or a diaphragm 23 may be employed having an opening corresponding in size to the number of electrodes used.

The primary winding 24 of the transformer is divided into a plurality of sections, connected as indicated in Fig. 9, to the contacts of the regulating switch 25. One terminal of the winding 24 is permanently connected by wire 26 with one brush of the generating portion of the motor generator, while the other brush of the generator portion of the motor generator is connected by wire 27 with the switch 25. In the arrangement shown in Fig. 9, the current supply is assumed to be direct and to be communicated by conductors 28 and 29 with the commutator 30 of the motor generator. The secondary winding 31 is connected by wires 21 and 22 as described above. By means of the arrangement indicated in Fig. 9, varying potentials may be produced between the conductors 21 and 22. The switch 25 is operated by means of a knob 32, located outside of the casing 5, which removably engages the switch 25 in the manner indicated in Fig. 2, in order that the knob may be removed when it is desired to remove the casing 5 from the base 1.

The operation of the machine is as follows: The motor 11 is started, and the switch 25 is adjusted to produce the desired potential between the electrodes 16 and 17. The rotation of the fan 10 draws air into the passageway 8 through the screen 33 from between the feet of the base 1. On entering the inside of the machine through the circular opening 9, the air is forced upward around the transformer 15 and between the electrodes 16 and 17. After passing through the electrical zones produced by the electrodes, as a result of which the animal organisms contained in the air are killed and the particles of dust and dirt are removed, the air passes upward through the opening in the diaphragm 23 and out through the perforated band 6. Ozone is produced in considerable quantity by means of the electrodes 16 and 17, and passes out with the purified air. As is well known, ozone is a very beneficial agent in stimulating animal activity, and is particularly valuable as a means for eliminating disease tendencies in human beings as well as invigorating and increasing their normal activities. The effect of the electrical zones upon the particles of dust is to project them against the electrodes, particularly against the electrodes 16, and although the larger particles of dust are prevented from entering the machine by the screen 33, the small particles of dust are collected in considerable quantity upon the electrodes, which are removed from time to time for cleaning purposes.

It is important, in operating the machine, that the potential upon the electrodes be kept at a point somewhat below that necessitated to produce a disruptive discharge. If a disruptive discharge is produced, the tendency is to form nitrous oxids by the chemical combination of the nitrogen and oxygen of the air, and these oxids are very injurious to the health, constituting, as they do, poisonous compounds. The condition of discharge that is desirable to be maintained is what may be called static discharge of such a nature as to be inappreciable except for the slight luminosity attending its production. It is therefore advisable to reduce the intensity of discharge to as low a point as consistent with the proper treatment of the air that is passed through the machine. Our construction facilitates this operation in that the air is forced to take a number of parallel paths in passing between the different electrodes, and furthermore that a field of discharge of considerable extent is produced in each path, as a result of which the air is brought into thorough contact with the electrical field and is rendered thoroughly aseptic, and at the same time is freed from the dust and dirt contained in it and is supplied with ozone in sufficient quantities to render it invigorating and stimulating. The extent of the field produced by the electrodes 16 and 17 may be increased by removing the diaphragm 23 and the electrodes 16 and 17, and inserting in place of such electrodes wider electrodes, as indicated by the dotted line $16^d$, after which the diaphragm 23 is replaced on top of such electrodes.

In the modification shown in Fig. 10, the base 34 has formed centrally thereon a compartment by means of an annular flange 35. This compartment is adapted to receive the transformer 15, which is connected and operates in substantially the manner described in connection with the construction shown in Figs. 2 and 3. A horizontal insulating partition or diaphragm 36 rests upon the flange 35, and serves to cover the transformer receptacle and to support the electrodes 16 and 17 by means of the insulating blocks 37. The arrangement of the electrodes 16 and 17 relatively to each other and their connection to the terminals of the secondary circuit of the transformer 15 is similar to that already described above. The construction of the electrodes 16 and 17 is also similar to the construction shown and described for such electrodes in Figs. 5 to 8, inclusive. On top of the insulating bars 37 and over the electrodes 16 and 17 an insulating diaphragm 23 is placed having an opening therein, as already described, to limit the air passing upward through the machine to that which passes between the electrodes 16 and 17. The diaphragm 36 supports two electric lamps 38 in tubes 39 extending upward from flanges formed on the base around openings 40 made therein. These openings are provided with screens 41 at their lower ends. The construction of the upper end of this modification is not shown, since it is substantially the same as that shown in Figs. 1 and 2. The operation of this modification of our machine is similar to that described above, with the exception that the circulation of air through the machine is caused by the lamps 38 since the only passage for admission of air to the machine is through the tubes 39. After leaving these tubes, the air passes through the openings 42 in the partition 36 and then between the electrodes 16 and 17 and up through the machine, as in the construction above described.

In Fig. 11 a modified arrangement of our machine is shown in which the casing $5^a$ is extended upward and terminates in a tube $5^b$ supported from the upper end of which is an electric lamp 43 surrounded by a shade 44. The lamp 43 is disposed over the upper end of the tube $5^b$, which constitutes the discharge opening from the machine. This arrangement, therefore, serves the double purpose of a lamp for illuminating purposes and a machine for purifying and ozonizing the air. The lamp, it is to be noticed, by its disposition over the upper end of the tube $5^b$, serves to cause the circulation of the air through the machine and thus to increase its efficiency of operation.

In Fig. 12, we have shown a modified form of casing, in which the casing 5 is surmounted by a solid band $6^a$ with which a plurality of pipes 45 are connected. By means of these pipes the air, after it has been treated, may be conducted to points at a distance from the machine, and thus a single machine may be caused to purify the air for a number of different locations.

For some conditions, particularly where it is not necessary to produce any very strong fields, the arrangement indicated in Fig. 13 may be employed. In this arrangement, the electrodes 16 are replaced by strips 46 similar in size to such electrodes, but consisting only of high strength dielectric material, as glass, while the electrodes 17 are so connected to the secondary winding 31 of the transformer 15 that the electrodes on opposite sides of any strip 46 are of opposite potential.

The construction of the electrodes 17 serves to facilitate electrical discharge from them, as a result of which the electrical field necessary for the successful operation of the machine may be readily produced and the construction of the electrodes 16 serves to intensify the electrical fields thus produced and to maintain them as a result of the condenser action exerted by such electrodes 16. In this way, the tendency of the points of the conducting wires 17$^b$ of the electrodes 17 to easily and readily dissipate the electrical charge without producing the results desired is overcome, and electrical fields may be produced that are as intense as consistent with the successful operation of the machine. The condenser effect described is present to a certain degree in the arrangement shown in Fig. 13, on account of the nearness of the electrodes 17 to each other, but this construction will not permit the production of as intense electrical fields as will that shown and described in connection with Figs. 2 and 3, since there is greater danger of disruptive discharge.

While we have shown our invention in the particular embodiments herein described, we do not, however, limit ourselves to these arrangements but desire to claim broadly any equivalents that will suggest themselves to those skilled in the art.

What we claim is:

1. In a machine for ozonizing air, the combination of a plurality of electrodes adapted to produce a high tension electrical field, alternate ones of such electrodes being inclosed in a high strength dielectric and the intermediate electrodes being exposed, and a step up transformer for charging such electrodes, such transformer having a primary winding wound in sections one or more of which may be connected in circuit as desired.

2. In a machine for ozonizing air, the combination of a plurality of electrodes adapted to produce a high tension electrical field, alternate ones of such electrodes being connected together by a common spring terminal and intermediate ones of such electrodes being connected together by a second common spring terminal.

3. In a machine for ozonizing air, the combination of a plurality of electrodes adapted to produce a high tension electrical field, alternate ones of such electrodes being connected together by a common spring terminal and intermediate ones of such electrodes being connected together by a second common spring terminal, and a step up transformer, the secondary winding of which is connected to such terminals.

4. In a machine for ozonizing air, the combination of a plurality of electrodes adapted to produce a high tension electrical field, alternate ones of such electrodes being connected together by a common spring terminal and intermediate ones of such electrodes being connected together by a second common spring terminal, a step up transformer, the secondary winding of which is connected to such terminals, and a fan for passing air through the electrified zones produced around such electrodes.

5. In a machine for ozonizing air, the combination of a plurality of electrodes adapted to produce a high tension electrical field, alternate ones of such electrodes being connected together by a common spring terminal and intermediate ones of such electrodes being connected together by a second common spring terminal, and a step up transformer, the secondary winding of which is connected to such terminals, such transformer having a primary winding wound in sections one or more of which may be connected in circuit as desired.

6. In a machine for ozonizing air, the combination of a supporting frame-work, positive electrodes supported by said framework, each of said electrodes consisting of a strip of fabric, a plurality of wire terminals extending outward from said strip, a metal backing for said wire terminals, and negative electrodes associated with said positive electrodes.

7. In a machine for ozonizing air, the combination of a base, a framework supported by the base, positive electrodes supported by the framework, high strength dielectric material interposed between such electrodes; each of such electrodes consisting of a strip of fabric, a plurality of wire terminals extending outward from such strip, and a metal backing for connecting such wires, and negative electrodes carried by said dielectric material.

8. In an ozone machine, the combination with a positive electrode comprising a strip of fabric, conducting wires extending from one face of such strip, conducting material in finely divided condition on the other face of the strip in contact with such wires, and a metal plate for retaining such conducting material in place, of a negative electrode, and current conductors connecting with said plate and negative electrode respectively.

9. In an ozone machine, the combination with a positive electrode comprising a strip of fabric, conducting wires extending from one face of such strip, conducting material in finely divided condition on the other face of the strip in contact with such wires, and a metal plate for retaining such conducting material in place, such plate folded about the edges of such strip, of a negative electrode, and current conductors connecting with said plate and negative electrode respectively.

10. In an ozone producing machine, the combination with a positive electrode comprising a strip of fabric, conducting staples extending through such strip, and a metallic backing for connecting the backs of such staples together, of a negative electrode, and current conductors connected with said metallic backing and said negative electrode respectively.

11. In an ozone machine, the combination with a positive electrode comprising a strip of fabric, conducting staples extending through such strip, conducting material in finely divided condition on the other face of the strip in contact with such staples, and a metal plate for retaining such conducting material in place, of a negative electrode, and current conductors connecting with said plate and negative electrode respectively.

12. In an ozone machine, the combination with a positive electrode comprising a strip of fabric, conducting staples extending through such strip, conducting material in finely divided condition on the other face of the strip in contact with such staples, and a metal plate for retaining such conducting material in place, such plate folded about the edges of such strip, of a negative electrode, and current conductors connecting with said plate and negative electrode respectively.

13. In an ozone producing machine, the combination with a positive electrode, comprising a supporting strip, wire bristles supported by said strip and extending outwardly therefrom and closely together, and a common terminal clamped to the strip to be in electrical contact with each of said bristles, of a negative electrode associated with said positive electrode.

14. In an ozonizing machine, the combination with a positive electrode, comprising a supporting strip, wire bristles extending from the front face of said strip closely together and parallel and extending through said strip to the back thereof, and a metal strip folded about the edges of said supporting strip having engagement with all of said bristles and forming a common terminal therefor, of a negative electrode associated with said positive electrode.

15. In an ozonizing machine, the combination of a supporting frame, parallel vertical supporting bars carried on said frame, vertical slots in said bars, contact spring plates adjacent said slots, and electrode units slidable in said slots to electrically engage with said contact springs.

16. In an ozonizing machine, the combination of opposite supporting members, parallel slots in said supporting members, a terminal plate on each supporting member having contact tongues adjacent said slots, and electrode units slidable in said slots to electrically engage with said contact tongues.

17. In an ozonizing machine, the combination of opposite supporting bars, parallel slide ways cut in said bars, electrode units adapted to be readily slid into and out of said slideways, a terminal on each electrode unit, and spring tongues on said supporting bars frictionally engaging with the contacts of the electrode units when in the slideways whereby to electrically connect with said electrode units and to yieldingly lock them in the slideways.

18. In combination, an ozonizing machine, positive electrode structures each comprising similar halves, each half comprising a supporting strip carrying bristles having their points extending parallelly in one direction from the strip and their backs electrically connected together, supporting means for supporting and holding pairs of halves back to back to form the positive electrode structures, and negative electrode structures on said supporting means alternated with said positive electrode structures.

19. In combination, an ozonizing machine, positive electrode units each comprising a supporting strip having bristles extending parallelly in one direction therefrom and having a metallic backing electrically connecting the bases of the bristles, electrode supporting frame-work, said positive electrode units being arranged back to back in pairs on said supporting framework, and negative electrode units supported on said framework between said pairs of positive electrodes.

20. In combination, an ozonizing machine, positive electrode units each comprising a supporting strip having bristles extending parallelly from one face thereof and having a metal backing in electrical contact with the bases of all the bristles, supporting bars having parallel slideways, said positive electrode units being arranged back to back in pairs, and slid into alternate slideways to form positive electrode structures, and negative units engaging in intermediate slideways for coöperating with said positive electrode structures.

21. In combination, an ozonizing machine, positive electrode units each comprising a supporting strip having bristles extending parallelly from one face thereof and having a metal backing in electrical contact with the bases of all the bristles, supporting bars having parallel slideways, said positive electrode units being arranged back to back in pairs, and slid into alternate slideways to form positive electrode structures, negative units engaging in intermediate slideways for coöperating with said positive electrode structures, terminal tongues on one supporting bar adjacent the alternate slideways for electrically engaging with the metal backs of the positive electrode structures, and terminal tongues on the other supporting bar adjacent the intermediate slideways for electrically engaging with the negative electrode units.

22. In an ozonizing machine, the combination of a negative electrode comprising a dielectric plate and a conductive plate intimately associated with said dielectric plate without the interposition of an air gap, and a positive electrode in the form of a brush having wire bristles, said electrodes being associated with the points of the bristles opposed to said dielectric plate but out of direct contact therewith.

In witness whereof, we hereunto subscribe our names this 16th day of June A. D. 1909.

SAMUEL C. SHAFFNER.
SAMUEL T. HUTTON.

Witnesses:
  ALBERT C. BELL,
  ROBERT F. BRACKE.